United States Patent
Lau

[11] Patent Number: 5,920,493
[45] Date of Patent: Jul. 6, 1999

[54] APPARATUS AND METHOD TO DETERMINE A MOST SIGNIFICANT BIT

[75] Inventor: Hon Shing Lau, Allentown, Pa.

[73] Assignee: Lucent Technologies, Inc., Murray Hill, N.J.

[21] Appl. No.: 08/912,046

[22] Filed: Aug. 15, 1997

Related U.S. Application Data

[63] Continuation of application No. 08/523,971, Sep. 6, 1995, abandoned.

[51] Int. Cl.[6] .......................................... G06F 7/38
[52] U.S. Cl. .................................. 364/715.04; 364/715.1
[58] Field of Search ........................... 364/715.04, 715.1, 364/715.08

[56] References Cited

U.S. PATENT DOCUMENTS

| | | | |
|---|---|---|---|
| 4,247,891 | 1/1981 | Flynn et al. | 364/748 |
| 4,758,974 | 7/1988 | Fields et al. | 364/748 |
| 4,864,527 | 9/1989 | Peng et al. | 364/748 |
| 4,887,084 | 12/1989 | Yamaguchi | 341/160 |
| 4,926,369 | 5/1990 | Hokenek et al. | 364/748 |
| 4,969,118 | 11/1990 | Montoye et al. | 364/748 |
| 5,016,209 | 5/1991 | Ikeda et al. | 364/748 |
| 5,144,570 | 9/1992 | Maher, III | 364/715.04 |
| 5,197,023 | 3/1993 | Nakayama | 364/748 |
| 5,204,825 | 4/1993 | Ng | 364/715.04 |
| 5,222,037 | 6/1993 | Taniguchi | 364/748 |
| 5,282,156 | 1/1994 | Miyoshi et al. | 364/748 |
| 5,317,527 | 5/1994 | Britton et al. | 364/715.04 |
| 5,341,319 | 8/1994 | Madden et al. | 364/748 |
| 5,343,413 | 8/1994 | Inoue | 364/748 |
| 5,359,548 | 10/1994 | Yoshizawa et al. | 364/748 |
| 5,375,078 | 12/1994 | Hrusecky et al. | 364/736 |
| 5,493,520 | 2/1996 | Schmookler et al. | 364/715.1 |

Primary Examiner—David H. Malzahn

[57] ABSTRACT

An adder using a leading zero/one detector (LZD) circuit and method of use determine an exact normalization shift with fewer logic levels and number of gates, resulting in saving considerable execution time to improve not only the timing as well as to reduce the size of the logic implementing the adder. In addition, a parallel method to locate the most significant digit is disclosed. Such an LZD circuit and method may be incorporated in an integrated circuit, and the LZD circuit includes a propagation value generator for generating a propagation value from input signals representing operands; and a location value generator for generating the location value from the generated propagation value.

18 Claims, 7 Drawing Sheets

APPARATUS AND METHOD TO DETERMINE A MOST SIGNIFICANT BIT

This application is a continuation of application Ser. No. 08/523,971, filed on Sep. 6, 1995, now abandoned.

BACKGROUND OF THE INVENTION

1. Field of the Invention

This disclosure relates to floating point addition circuits, and in particular to a leading zero/one detection circuit and method.

2. Description of the Related Art

After a floating point addition, normalization is performed on the unnormalized sum of operands so that the resulting sum is a normalized number. In conventional methods, the unnormalized sum is searched by leading zero/one detection (LZD) techniques for the leading zero/one, depending on the sign of the number. Then the unnormalized sum is shifted by the amount determined by the LZD to the left and the floating point is adjusted accordingly. Generally, the amount to be shifted cannot be calculated until the addition is done. Various LZD circuits and methods are known in the art. In another technique that significantly speeds circuit operation, U.S. Pat. No. 4,758,974 to Fields et al., which is co-assigned herewith and is incorporated by reference, describes a most significant digit (MSD) location system and method to at least approximately determine the MSD during the addition operation.

SUMMARY

An adder using an LZD circuit and method of use is disclosed to determine an exact normalization shift. In addition, a parallel method to locate the MSD is disclosed. Such an LZD circuit and method may be incorporated in an integrated circuit, and the LZD circuit may include a propagation value generator for generating a propagation value from input signals representing operands; and a location value generator for generating the location value from the generated propagation value.

The disclosed adder may also include a shift generator for determining a shifting condition from the location value and from parameters generated during the combining of operands. The shift generator responds to the shifting condition for generating a shift signal for use in normalizing an unnormalized result of the combining of operands to generate a normalized sum output signal.

BRIEF DESCRIPTION OF THE DRAWINGS

The features of the disclosed adder using the LZD circuit and method will become more readily apparent and may be better understood by referring to the following detailed description of an illustrative embodiment of the present invention, taken in conjunction with the accompanying drawings, where.

DESCRIPTION OF THE PREFERRED EMBODIMENTS

Figure 1:
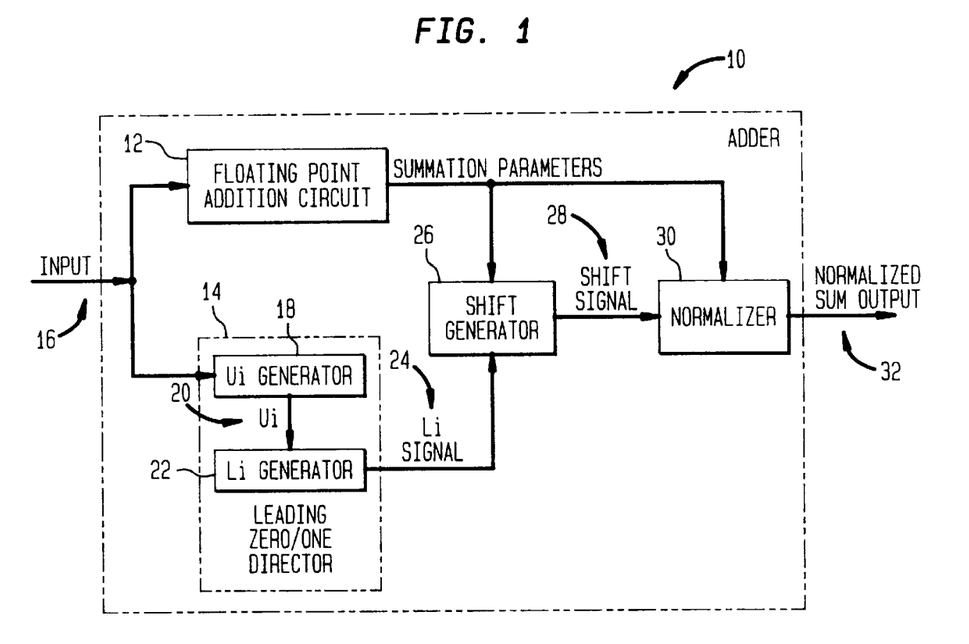
FIG. 1 shows a block diagram of the disclosed adder.

The following detailed description relates to an adder which determines an exact location of the MSD using LZD circuits operating parallel with the addition. A typical technique implementing the adder results in a reduced number of logic levels which saves considerable execution time in adding and normalizing operands. Referring now in specific detail to the drawings, with like reference numerals identifying similar or identical elements, as shown in FIG. 1, the present disclosure describes an adder 10 and method of use which may be implemented on an integrated circuit. The adder 10 includes a floating point addition circuit 12 and a leading zero/one detector (LZD) circuit 14 operating concurrently with and in parallel to the floating point addition circuit 12 to process the received inputs 16.

Figure 2:
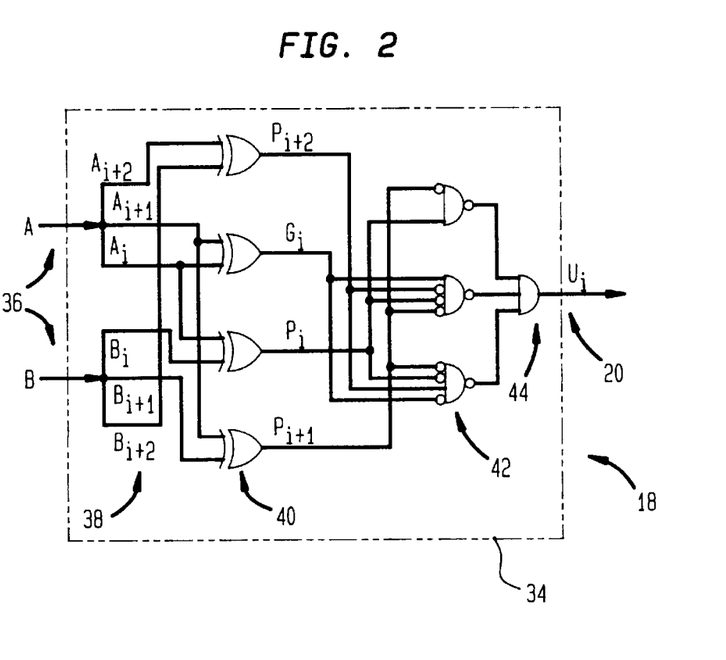
FIG. 2 illustrates an exemplary logic diagram of a propagation value generator.

The received inputs 16 include data signals representing operands, such as exemplary operands labelled A and B, as in FIG. 2, and the floating point addition circuit 12 is a typical circuit for combining the operands to generate an unnormalized floating point sum as data signals, including signals representing unnormalized sum values $S_i$, carry values $C_i$, and sign values of the sum values $S_i$ from the input signals 16. The LZD 14 includes a propagation value $U_i$ generator 18 for generating a propagation value as $U_i$ signal 20, as described in further detail below, and the LZD 14 includes a location value $L_i$ generator 22 for generating a location value as an $L_i$ signal 24 from the $U_i$ signal 20, as described in further detail below.

The adder 10 further includes a shift generator 26 and a normalizer 30. The shift generator 26 receive the $L_i$ signal 24 as well as the data signals from the floating point addition circuit 12 to generate a shift signal 28. The normalizer 30 receives the shift signal 28 for shifting and normalizing the unnormalized sum signal from the floating point addition circuit 12 to generate a normalized sum output 32.

The adder 10, including the various components 12–30, is typically incorporated in an integrated circuit (IC) and may be connected to or incorporated with other circuitry of the IC such as storage registers and arithmetic/logic units (ALUs). The adder 10 is controlled in a manner known in the art by a control mechanism included in or operatively connected to the IC. The floating point addition circuit 12 may be implemented in a manner known in the art, such as the floating point addition circuit described in commonly assigned U.S. Pat. No. 4,758,974 to Fields et al., which is incorporated herein by reference.

After adding two floating point numbers, the sum generated by the floating point addition circuit 12 is an unnormalized floating point number. The following describes the 4 possible cases, with the location of the MSD indicated by a logic 1 in the location values $L_i$; i.e. $L_i=1$ at the MSD.

Case A: A > 0, B > 0, A + B > 0

Example 1

| Oper-<br>and | Bit: | n | | | | | i + 1 | i | i − 1 | | 0 |
|---|---|---|---|---|---|---|---|---|---|---|---|
| A | | 0 | 0 | 0 | 0 | … 0 | | 0 | X | X | … X |
| B | | 0 | 0 | 0 | 0 | … 0 | | 1 | X | X | … X |

-continued

| Operand Bit: | n | | | | | i + 1 | i | i − 1 | | 0 |
|---|---|---|---|---|---|---|---|---|---|---|
| U | 1 | 1 | 1 | 1 | ... 1 | 0 | X | X | ... | X |
| L | 0 | 0 | 0 | 0 | ... 0 | 1 | 0 | 0 | ... | 0 |

Example 2

| Operand Bit: | n | | | | | i + 1 | i | i − 1 | | 0 |
|---|---|---|---|---|---|---|---|---|---|---|
| A | 0 | 0 | 0 | 0 | ... 0 | 1 | X | X | ... | X |
| B | 0 | 0 | 0 | 0 | ... 0 | 0 | X | X | ... | X |
| U | 1 | 1 | 1 | 1 | ... 1 | 0 | X | X | ... | X |
| L | 0 | 0 | 0 | 0 | ... 0 | 1 | 0 | 0 | ... | 0 |

Example 3

| Operand Bit: | n | | | | | i + 1 | i | i − 1 | | 0 |
|---|---|---|---|---|---|---|---|---|---|---|
| A | 0 | 0 | 0 | 0 | ... 0 | 1 | X | X | ... | X |
| B | 0 | 0 | 0 | 0 | ... 0 | 1 | X | X | ... | X |
| U | 1 | 1 | 1 | 1 | ... 1 | 0 | X | X | ... | X |
| L | 0 | 0 | 0 | 0 | ... 0 | 1 | 0 | 0 | ... | 0 |

Case B: A < 0, B < 0, A + B < 0

Example 1

| Operand Bit: | n | | | | | i + 1 | i | i − 1 | | 0 |
|---|---|---|---|---|---|---|---|---|---|---|
| A | 1 | 1 | 1 | 1 | ... 1 | 0 | X | X | ... | X |
| B | 1 | 1 | 1 | 1 | ... 1 | 1 | X | X | ... | X |
| U | 1 | 1 | 1 | 1 | ... 1 | 0 | X | X | ... | X |
| L | 0 | 0 | 0 | 0 | ... 0 | 1 | 0 | 0 | ... | 0 |

Example 2

| Operand Bit: | n | | | | | i + 1 | i | i − 1 | | 0 |
|---|---|---|---|---|---|---|---|---|---|---|
| A | 1 | 1 | 1 | 1 | ... 1 | 1 | X | X | ... | X |
| B | 1 | 1 | 1 | 1 | ... 1 | 0 | X | X | ... | X |
| U | 1 | 1 | 1 | 1 | ... 1 | 0 | X | X | ... | X |
| L | 0 | 0 | 0 | 0 | ... 0 | 1 | 0 | 0 | ... | 0 |

Example 3

| Operand Bit: | n | | | | | i + 1 | i | i − 1 | | 0 |
|---|---|---|---|---|---|---|---|---|---|---|
| A | 1 | 1 | 1 | 1 | ... 1 | 0 | X | X | ... | X |
| B | 1 | 1 | 1 | 1 | ... 1 | 0 | X | X | ... | X |
| U | 1 | 1 | 1 | 1 | ... 1 | 0 | X | X | ... | X |
| L | 0 | 0 | 0 | 0 | ... 0 | 1 | 0 | 0 | ... | 0 |

Case C: A > 0, B < 0, A + B < 0

Example 1

| Operand Bit: | n | | | | | i + 1 | i | i − 1 | | 0 |
|---|---|---|---|---|---|---|---|---|---|---|
| A | 0 | 0 | 1 | 0 | ... 0 | 0 | X | X | ... | X |
| B | 1 | 1 | 0 | 1 | ... 0 | 1 | X | X | ... | X |
| U | 1 | 1 | 1 | 1 | ... 1 | 0 | X | X | ... | X |
| L | 0 | 0 | 0 | 0 | ... 0 | 1 | 0 | 0 | ... | 0 |

Example 2

| Operand Bit: | n | | | | | i + 1 | i | i − 1 | | 0 |
|---|---|---|---|---|---|---|---|---|---|---|
| A | 0 | 0 | 1 | 0 | ... 0 | 1 | X | X | ... | X |
| B | 1 | 1 | 0 | 1 | ... 0 | 0 | X | X | ... | X |
| U | 1 | 1 | 1 | 1 | ... 1 | 0 | X | X | ... | X |
| L | 0 | 0 | 0 | 0 | ... 0 | 1 | 0 | 0 | ... | 0 |

Example 3

| Operand Bit: | n | | | | | i + 1 | i | i − 1 | | 0 |
|---|---|---|---|---|---|---|---|---|---|---|
| A | 0 | 0 | 1 | 0 | ... 0 | 0 | X | X | ... | X |
| B | 1 | 1 | 0 | 1 | ... 0 | 0 | X | X | ... | X |
| U | 1 | 1 | 1 | 1 | ... 1 | 0 | X | X | ... | X |
| L | 0 | 0 | 0 | 0 | ... 0 | 1 | 0 | 0 | ... | 0 |

Case D: A > 0, B < 0, A + B > 0

Example 1

| Operand Bit: | n | | | | | i + 1 | i | i − 1 | | 0 |
|---|---|---|---|---|---|---|---|---|---|---|
| A | 0 | 0 | 1 | 0 | ... 1 | 0 | X | X | ... | X |
| B | 1 | 1 | 0 | 1 | ... 1 | 1 | X | X | ... | X |
| U | 1 | 1 | 1 | 1 | ... 1 | 0 | X | X | ... | X |
| L | 0 | 0 | 0 | 0 | ... 0 | 1 | 0 | 0 | ... | 0 |

Example 2

| Operand Bit: | n | | | | | i + 1 | i | i − 1 | | 0 |
|---|---|---|---|---|---|---|---|---|---|---|
| A | 0 | 0 | 1 | 0 | ... 1 | 1 | X | X | ... | X |
| B | 1 | 1 | 0 | 1 | ... 1 | 0 | X | X | ... | X |
| U | 1 | 1 | 1 | 1 | ... 1 | 0 | X | X | ... | X |
| L | 0 | 0 | 0 | 0 | ... 0 | 1 | 0 | 0 | ... | 0 |

Example 3

| Operand Bit: | n | | | | | i + 1 | i | i − 1 | | 0 |
|---|---|---|---|---|---|---|---|---|---|---|
| A | 0 | 0 | 1 | 0 | ... 1 | 1 | X | X | ... | X |
| B | 1 | 1 | 0 | 1 | ... 1 | 1 | X | X | ... | X |
| U | 1 | 1 | 1 | 1 | ... 1 | 0 | X | X | ... | X |
| L | 0 | 0 | 0 | 0 | ... 0 | 1 | 0 | 0 | ... | 0 |

The term "digit" is herein defined to be a symbol used in a predetermined system of numeration implemented by the adder 10. In the examples herein disclosed, binary digits are illustrated, in which the disclosed adder 10 performs addition of data signals representing operands in base 2. It is understood that one having ordinary skill in the art may implement the principles of the disclosed adder 10 and method of use to perform addition or subtraction of data signals representing operands in any base, such as base 10.

In the above tables, n is a leftmost value, which may be equal to N−1, where N is the number of bits in the operands; for example, N=32 for 32-bit addition. The "X" values above indicate "Don't Care" bits, and the U function is a propagation function generated from the operands, where the $U_i$ values 20 may be used to propagate a pointer to locate the location of the MSD.

In an exemplary embodiment, the logic equation for U may be expressed as follows:

$$U_i = (\text{NOT } N_1) \text{ AND } (\text{NOT } N_2) \text{ AND } (\text{NOT } N_3) \tag{1}$$

where $N_1 = P_i \text{ AND } (\text{NOT } P_{i+1})$ $N_2 = (\text{NOT } P_i) \text{ AND } (\text{NOT } P_{i+1}) \text{ AND } (\text{NOT } P_{i+2}) \text{ AND } G_i$ $N_3 = (\text{NOT } P_i) \text{ AND } (\text{NOT } P_{i+1}) \text{ AND } P_{i+2} \text{ AND } (\text{NOT } G_i)$ with $G_i = (A_i \text{ XOR } A_{i+1})$ and propagation carry pointers $P_i$, $P_{i+1}$, and $P_{i+2}$ are defined at bit locations i, i+1, i+2, respectively, as:

$P_i = A_i$ XOR $B_i$, $P_{i+1} = A_{i+1}$ XOR $B_{i+1}$, $P_{i+2} = A_{i+2}$ XOR $B_{i+2}$.

The LZD 14 includes a $U_i$ generator 18 for implementing Equation (1) above. In an exemplary embodiment shown in FIG. 2, the $U_i$ generator 18 includes a plurality of cells 34 of logic gates configured in 3 logic stages; i.e. 3 stages of logic gates configured in 4 logic levels. Each cell generates each $U_i$, for i=0 to N−1, from operands 36 labelled A, B, having associated bits 38 labelled $A_i$, $A_{i+1}$, $A_{i+2}$, $B_i$, $B_{i+1}$, $B_{i+2}$. As shown in FIG. 2, exclusive-OR (XOR) gates in a first logic stage 40 receive the bits 38 to generate $P_i$, $P_{i+1}$, $P_{i+2}$, and $G_i = (A_i$ XOR $A_{i+1})$, where 2 logic levels may implement the XOR gates in the first logic stage 40, so the 3 logic stages may include at most 4 logic levels. The second logic stage 42 includes NAND gates and inverters for generating $N_1$, $N_2$, and $N_3$, as described above. The third logic stage 44 includes an AND gate for generating $U_i$ from $N_1$, $N_2$, and $N_3$, as described above in Equation (1).

In an alternative embodiment, the propagation value $U_i$ may be expressed as:

$$U_i = (\text{NOT } N_4) \text{ AND } (\text{NOT } N_5) \tag{2}$$

where $N_4 = (G_i$ OR $H_i)$ AND (NOT $P_{i+2}$)

$N_5 = $ NOT $(G_i$ AND $H_i)$ AND $P_{i+2}$ AND (NOT $P_{i+1}$)

with $H_i = (B_i$ XOR $B_{i+1})$.

Figure 3:
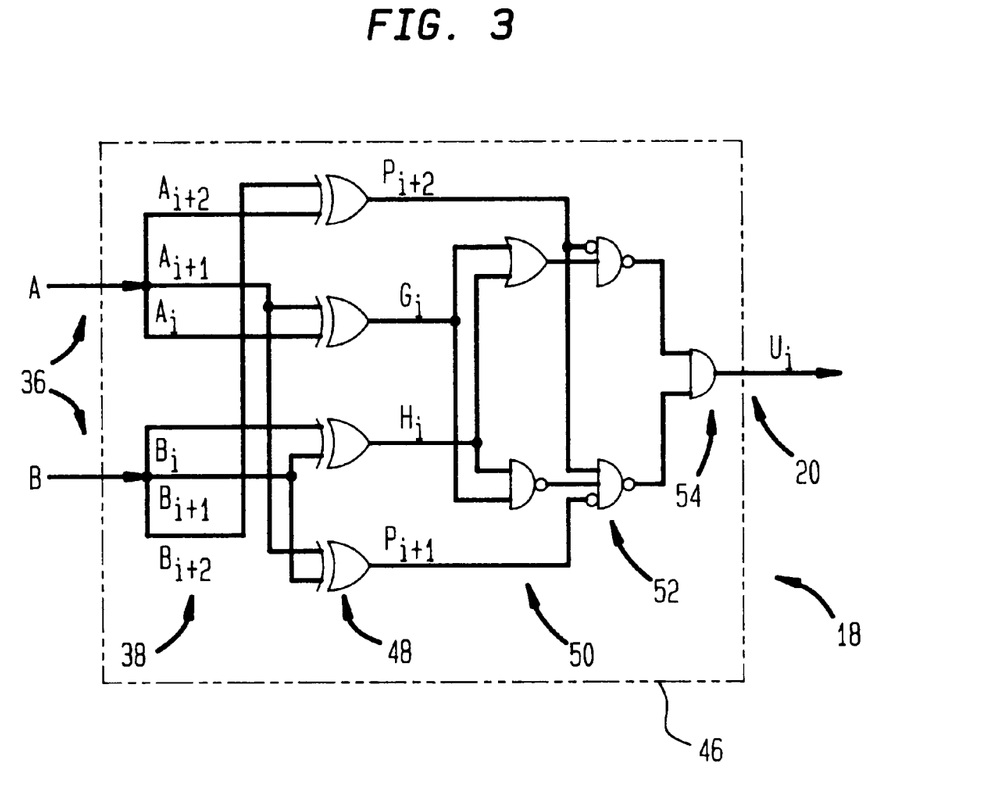
FIG. 3 illustrates an alternative logic diagram of a propagation value generator.

The $U_i$ generator 18 may implement Equation (2) above as shown in FIG. 3 in an exemplary embodiment, where the $U_i$ generator 18 includes a plurality of cells 46 of logic gates configured in 4 logic stages; i.e. 4 stages of logic gates configured in logic levels. As shown in FIG. 3, the 4 logic stages may include 5 logic levels, where each XOR gate may be implemented using 2 logic levels. Each cell generates each $U_i$, for i=0 to N−1, from operands 36 labelled A, B, having associated bits 38 labelled $A_i$, $A_{i+1}$, $A_{i+2}$, $B_i$, $B_{i+1}$, $B_{i+2}$. As shown in FIG. 2, exclusive-OR (XOR) gates in a first logic stage 48 receive the bits 38 to generate $P_{i+1}$, $P_{i+2}$, $G_i = (A_i$ XOR $A_{i+1})$, and $H_i = (B_i$ XOR $B_{i+1})$, where 2 logic levels may implement the XOR gates in the first logic stage 48, so the 4 logic stages include at most 5 logic levels. The second logic stage 50 includes an OR gate and a NAND gate. The third logic stage 52 includes NAND gates and inverters for generating $N_4$ and $N_5$, as described above. The fourth logic stage 54 includes an AND gate for generating $U_i$ from $N_4$ and $N_5$, as described above in Equation (2).

Using the $U_i$ values 20 generated by the $U_i$ generator 18, the disclosed adder 10 performs a fast and parallel method for locating the approximate location of the MSD, and then generates the $L_i$ values to determine the exact location of the MSD to perform the shifting of the unnormalized floating point.

The disclosed LZD 14 includes an $L_i$ generator 22 to generate $L_i$ values 24 used to perform the LZD function. A positive integer value D is defined to be a predetermined number which depends, for example, on the operating characteristics of the disclosed LZD 14. For N being the total number of bits in the addition, the $L_i$ values for i=0 to N−1 are determined according to the Boolean expression:

$$L_i = \text{NOT } U_i \text{ AND } V_i \text{ AND } X_i \tag{3}$$

where $$V_i = \begin{cases} logic1 & \text{if } i = q \\ \text{AND}(U_{i+1}, U_q) & \text{if } i < q \end{cases}$$

$$W_i = \begin{cases} logic1 & \text{if } i \geq N - D \\ \text{AND}(U_r, U_s) & \text{if } i < N - D \end{cases}$$

$X_i = (\text{NOT AND } (U_p, U_q))$ AND $W_i$ and [ ] is the least integer function, k=[i/D] for i=0 to N−1, p=D*k, q=D*(k+1)−1, r=D*(k+1) for i<N−1 and r=N−1 for i=N−1, s=N−1, and the function AND(x, y) is defined as the ANDing of a sequences of values ranging from x to y. For example, $$\text{AND}(U_0, U_3) = U_0 \text{ AND } U_1 \text{ AND } U_2 \text{ AND } U_3 \tag{4}$$

with AND(x, x)=x; for example, AND($U_{31}$, $U_{31}$)=$U_{31}$.

Figure 4:
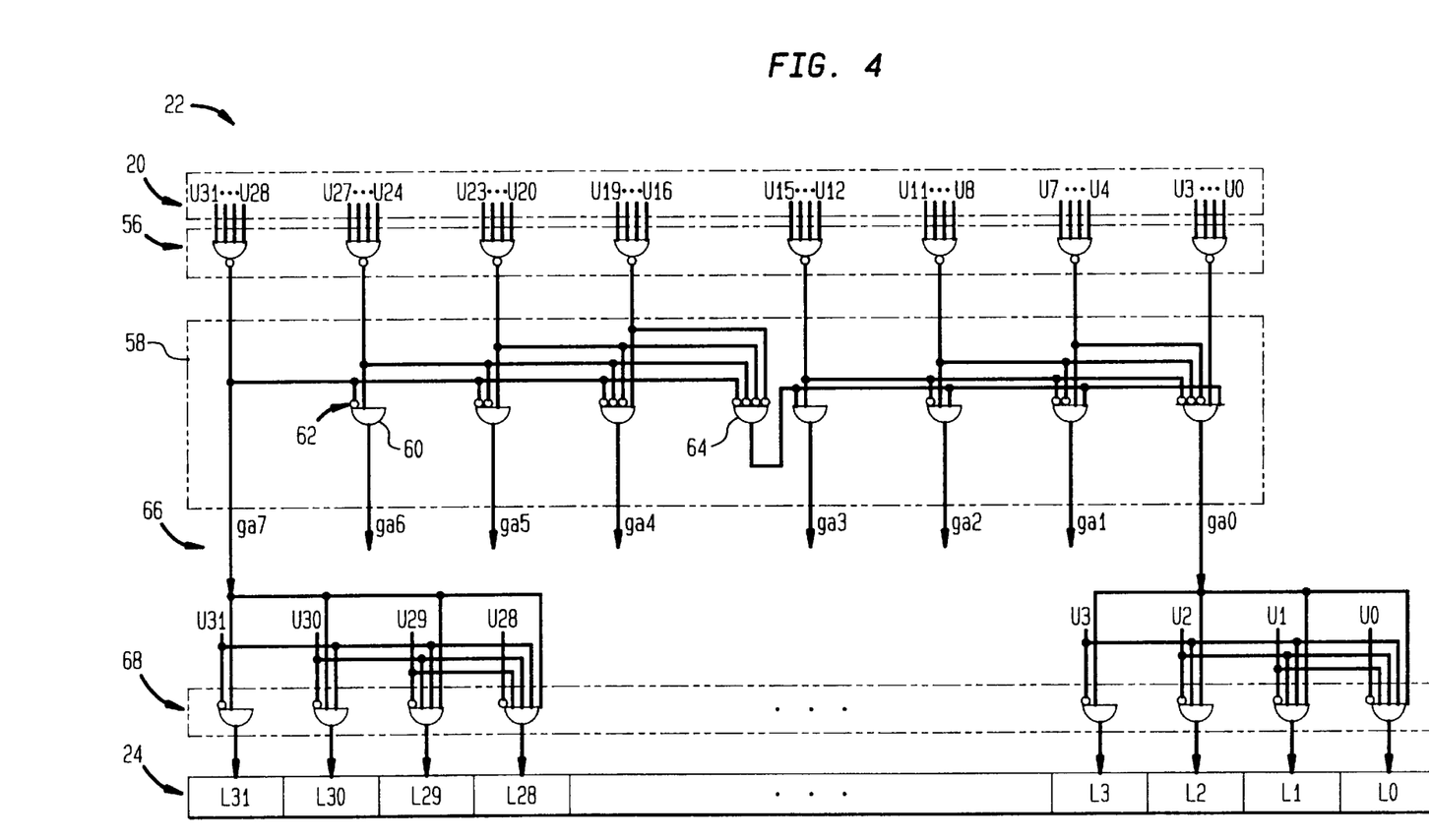
FIG. 4 illustrates an exemplary logic diagram of a location value generator.

From Equations (1)–(4) above, the $L_i$ values may be generated using, in an exemplary embodiment, the circuit including logic gates shown in FIG. 4 for determining the $L_i$ values where a leading zero is detected for normalizing a 32 bit addition, where, for example, N=32 and D=4 are used in Equations (1)–(4) above. The value of D may be determined by the operating characteristics of the logic gates in the $L_i$ generator 22. For example, such logic gates may operate optimally with a maximum of 4 inputs, so each of the logic gates has at most 4 inputs. It is understood that one skilled in the art is readily able to design logic circuits to perform the determination of the $L_i$ values for 32 bit addition as well as for 64 bit addition, 128 bit addition, and other multi-bit addition and subtraction operations in accordance with Equations (1)–(3) above.

The exemplary embodiments described above employ positive logic; i.e. the logic value TRUE is represented by a logic 1 or a high signal. It is also understood that one skilled in the art may use negative logic. In addition, it is understood that one skilled in the art may transform Equations (1)–(4) to be logically equivalent in function; for example, De Morgan's Laws may be applied to transform Equation (1) to $$U_i = \text{NOT } (N_1 \text{ OR } N_2 \text{ OR } N_3) \tag{5}$$

which may be implemented, for example, by replacing the NAND gates in the second stage 42 of FIG. 2 with AND gates, and by replacing the AND gate in the third stage 44 with a multiple-input NOR gate.

In the exemplary circuit shown in FIG. 4, the $L_i$ generator 22 includes a plurality of NAND gates 56 for receiving the $U_i$ values 20, where each AND gate receives D input values; for example, D=4. The output of each NAND gate 56 is received by a logic circuit 58 having a plurality of logic gates such as AND gate 60, inverter 62, and AND gate 64. In particular, the AND gates of logic circuit 58 perform an ANDing function on the output of a predetermined AND gate and an inverted output of a subset of NAND gates 56 succeeding the predetermined AND gate. The inverted outputs may be generated using inverters 62 as well as NAND gates 64. It is understood that two inverters in series may be eliminated to be logically equivalent to no inverters, but circuit timing may require the use of such pairs of inverters in series.

The logic circuit 58 outputs a sequence of output gate values 66 which are ANDed with respective $U_i$ values 20 or their negation by a plurality of AND gates 68 to respectively generate a plurality of $L_i$ values 24. Thus, the exemplary circuit of the $L_i$ generator 22 shown in FIG. 4 implements Equation (3) above. In particular, the gate output values 66 may be labelled $ga_0, ga_1, \ldots ga_7$, where, for a given $k=[i/D]$ with $i=0$ to $N-1$, $ga_k=X_i$, as defined above, for $i=D*k$ to $D*(k+1)-1$, and [ ] is the least integer function.

In an exemplary method for finding the exact location of the MSD using the $L_i$ values, described in greater detail below for FIG. 9, the shift generator 26 may determine if $L_i=1$ and the unnormalized sum value $S_{i+1}$ is different from the value $S_{i+2}$ of the unnormalized sum, and so generates a left shift; otherwise, there is a no shift; i.e. a shift condition is determined and a shift signal is generated accordingly.

Figure 5:
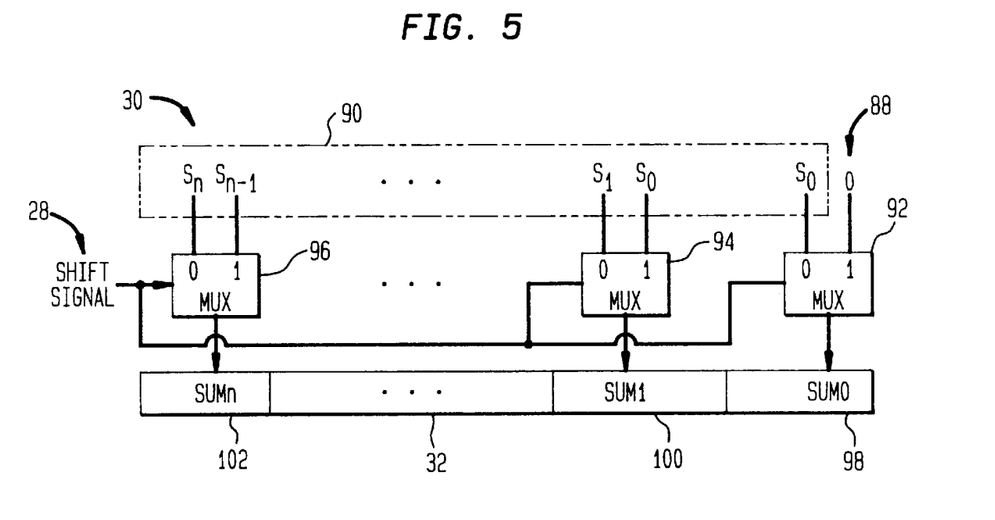
FIG. 5 shows a block diagram of a normalizer circuit.

The normalizer 30 receives the shift signal 28 and the unnormalized sum from the floating point addition circuit 12 and generates the normalized sum output 32 therefrom. In an exemplary embodiment shown in FIG. 5, the normalizer 30 receives a logic 0 value 88 and the unnormalized sum 90, which is a sequence of unnormalized values $S_0$ to $S_{n+1}$, at a plurality of switches 92–96. Each of the plurality of switches 92–96 is responsive to the shift signal 28 to switch between at least two successive values to generate a sequence of normalized sum values 98–102 labelled $SUM_0$, $SUM_1$, ... $SUM_n$ as the normalized sum. For example, switch 94 switches between $S_0$ and $S_1$ such that, when the shift signal 28 is high or logic 1, $S_0$ is output as $SUM_1$, and when the shift signal 28 is low or logic 0, $S_1$ is output as $SUM_1$. In an exemplary embodiment, the switches 92–96 are multiplexers (MUX). In alternative embodiments, the switches 92–96 may include shift registers, switching transistors, and/or logic gates operating to switch between successive unnormalized values in response to the shift signal 28 in a manner known in the art.

Figure 6:
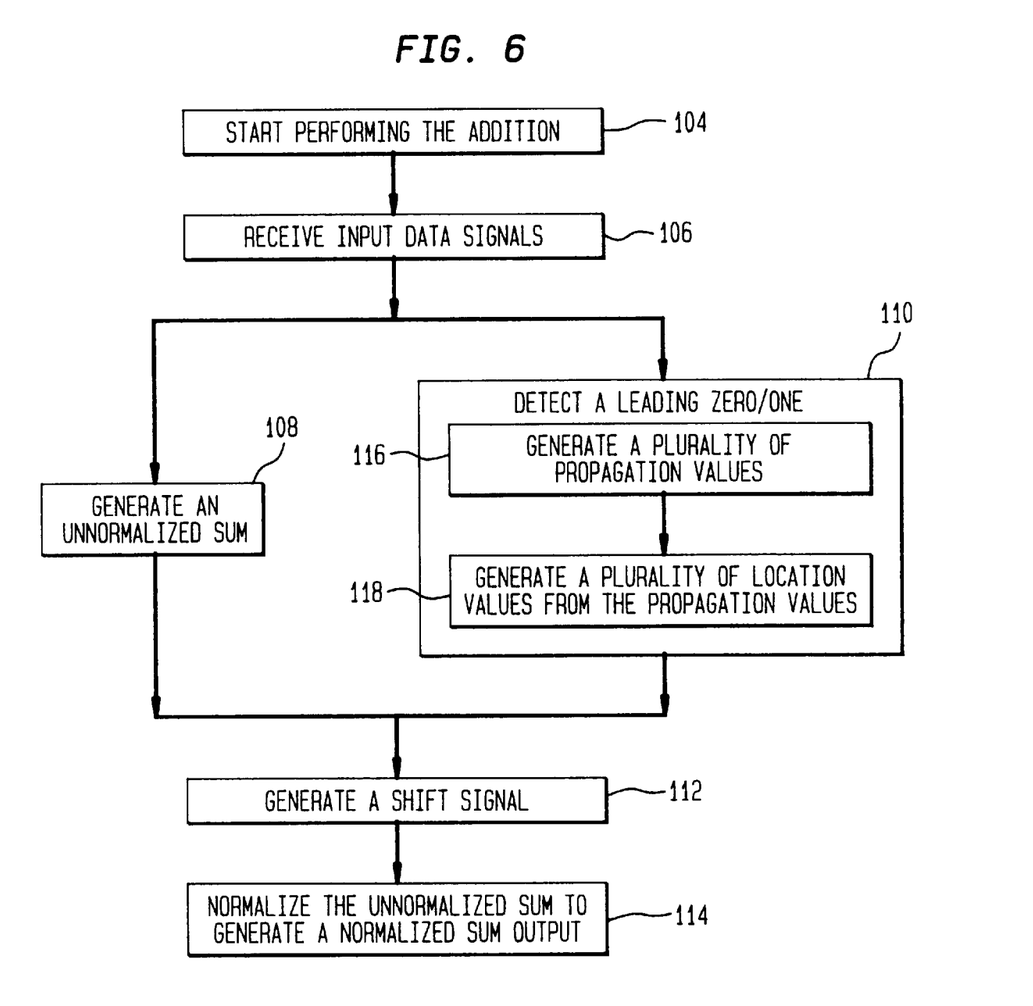
FIG. 6 shows a flowchart of the method of operation of the disclosed adder.

The operation of the adder 10 is illustrated by exemplary flowcharts in FIGS. 6–10. FIG. 6 shows the main operation of the adder 10, including the steps of starting to perform the addition in step 104; receiving input data signals 16 representing operands in step 106; generating an unnormalized sum of the input operands in step 108 using the floating point addition circuit 12; detecting a leading zero/one using the LZD 14 in step 110 concurrently and in parallel with the generation of the unnormalized sum in step 108; generating a shift signal 28 using the shift generator 26 in step 112; and normalizing the unnormalized sum in step 114 to generate the normalized sum output 32 using a normalizer 30 responding to the shift signal 28.

The step of detecting the leading zero/one in step 110 includes the steps of generating a plurality of propagation values 20 labelled $U_i$ in step 116 using the $U_i$ generator 18; and generating a plurality of location values 24 labelled $L_i$ as the $L_i$ signal in step 118 from the propagation values $U_i$. In particular, the $U_i$ and $L_i$ values are determined according to Equations (1)–(3) and are implemented by the methods shown in FIGS. 7–8.

Figure 7:
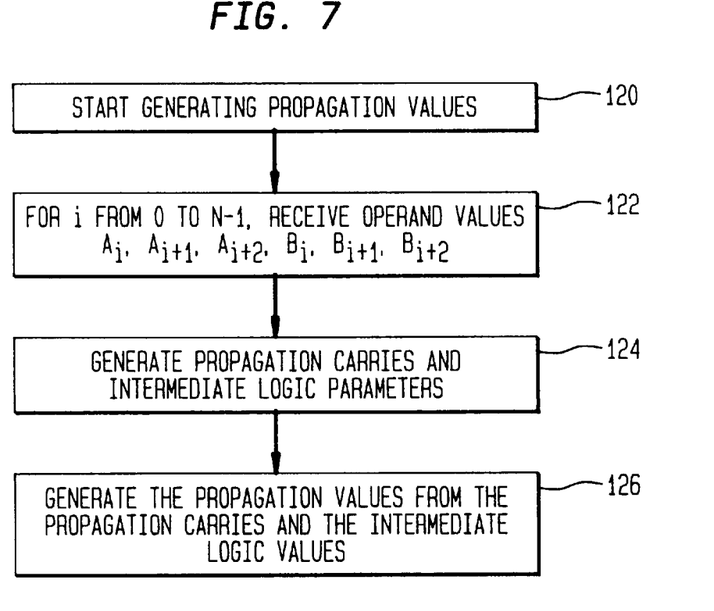
FIG. 7 shows a flowchart of a method for generating the propagation values.

Referring to FIG. 7 in conjunction with either embodiment shown in FIGS. 2–3, the step 116 of generating the $U_i$ values from $i=0$ to $N-1$ includes the steps of starting the generation of the $U_i$ in step 120; receiving operand values including $A_i, A_{i+1}, A_{i+2}, B_i, B_{i+1}, B_{i+2}$ of the operands A, B in step 122; generating propagation carries and intermediate logic values from the operand values in step 124, as described above in conjunction with Equation (1) using the stages 42–44 shown in FIG. 2, or alternatively as described above in conjunction with Equation (2) using the stages 50–54 shown in FIG. 3; and generating propagation values $U_i$ in step 126 from the propagation carries and intermediate logic values, in accordance with Equations (1) or (2), respectively. In particular, the intermediate logic values may include $G_i$ and $H_i$, as defined above.

Figure 8:
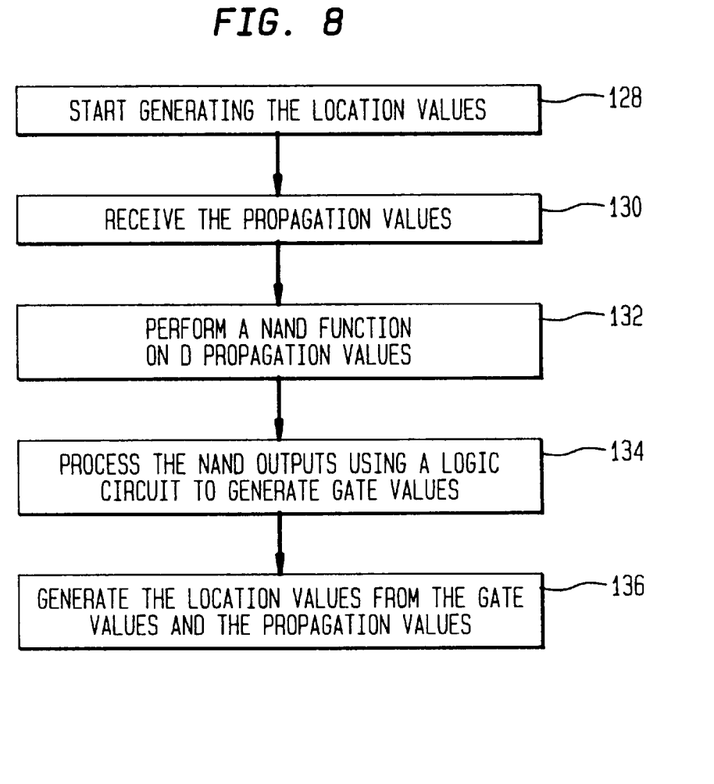
FIG. 8 shows a flowchart of a method for generating the location values.

Referring to FIG. 8 in conjunction with FIG. 4, the step 118 of generating $L_i$ values 24 includes the steps of starting the generation of $L_i$ values in step 128; receiving the $U_i$ values 20 in step 130 at a plurality of NAND gates 56; NANDing a predetermined number D of $U_i$ values at each NAND gate 56 in step 132; processing the output of the NAND gates 56 by a logic circuit 58 having a plurality of AND gates in step 134 to generate gate values $ga_k$ according to Equations (3), where $k=[i/4]$ for $i=0$ to $N-1$ and [ ] is the least integer function; and generating respective $L_i$ values from the $ga_k$ values and the respective $U_i$ values in step 136.

Figure 9:
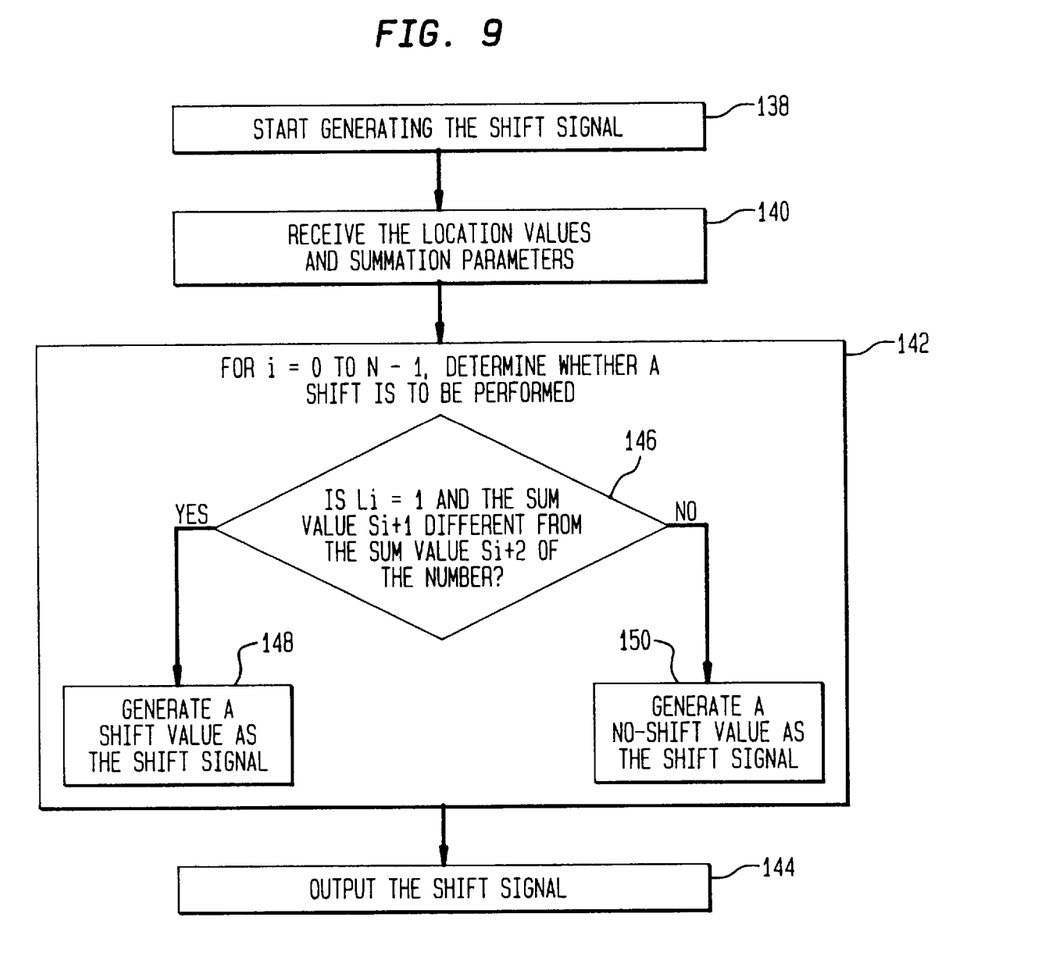
FIG. 9 shows a flowchart of a method for generating a shift signal from the location values.

The shift generator 26 then generates a shift signal 28 using the method shown in FIG. 9. Referring to FIG. 9, the shift generator 26 starts generating the shift signal 28 in step 138; receives the location values $L_i$ from the LZD 14 and summation parameters such as unnormalized sum values $S_i$ from the floating point addition circuit 12 in step 140; and then, for $i=0$ to $N-1$, the shift generator 26 determines whether a shift is to be performed in step 142, and outputs a shift signal in step 144. The step of determining a shift in step 142 includes steps 146–150, where, if $L_i=1$ and the sum value $S_{i+1}$ is determined in step 146 to be different from the value $S_{i+2}$ of the unnormalized sum, then the shift generator 26 generates a shift value such as a logic 1 as the shift signal 28 in step 148. Otherwise the shift generator 26 generates a no-shift value such as a logic 0 as the shift signal 28 in step 150. The shift generator 26 then outputs the shift signal 28 to the normalizer 30 in step 144.

While the disclosed adder and method have been particularly shown and described with reference to the preferred embodiments, it is understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. An integrated circuit including an adder for combining input signals representing a first operand A and a second operand B to obtain a normalized sum output signal, each operand including a plurality of digits, the adder of the integrated circuit comprising:

a leading zero/one detector (LZD), responsive to the combining of the operands to an unnormalized result, that generates during the combining an exact location value of the most significant digit of the unnormalized result and which causes a shift signal to be generated corresponding to the exact location value for normalizing the unnormalized result, wherein the LZD includes:

a propagation value generator that generates a propagation value from the input signals, wherein the propagation value generator includes a circuit that generates the propagation value $U_i$ from the plurality of bits $A_i, A_{i+1}, A_{i+2}, B_i, B_{i+1}, B_{i+2}$ corresponding to operands A, B at corresponding bit locations i, i+1, i+2, wherein:

$U_i$=(NOT $N_1$) AND (NOT $N_2$) AND (NOT $N_3$)

where $N_1$=$P_i$ AND (NOT $P_{i+1}$), $N_2$=(NOT $P_i$) AND (NOT $P_{i+1}$) AND (NOT $P_{i+2}$) AND $G_i$, $N_3$=(NOT $P_i$) AND (NOT $P_{i+1}$) AND $P_{i+2}$ AND (NOT $G_i$), $G_i$=($A_i$ XOR $A_{i+1}$), and propagation carry pointers $P_i$, $P_{i+1}$, and $P_{i+2}$ are defined at bit locations i, i+1, i+2, respectively, as:

$P_i = A_i$ XOR $B_i$, $P_{i+1} = A_{i+1}$ XOR $B_{i+1}$, $P_{i+2} = A_{i+2}$ XOR $B_{i+2}$;

and a location value generator that generates the location value from the generated propagation value and that normalizes the unnormalized result.

2. An integrated circuit including an adder for combining input signals representing a first operand A and a second operand B to obtain a normalized sum output signal, each operand including a plurality of digits, the adder of the integrated circuit comprising:

a leading zero/one detector (LZD), responsive to the combining of the operands to an unnormalized result, that generates during the combining an exact location value of the most significant digit of the unnormalized result and which causes a shift signal to be generated corresponding to the exact location value for normalizing the unnormalized result, wherein the LZD includes:

a propagation value generator that generates a propagation value from the input signals, wherein the propagation value generator includes a circuit that generates the propagation value $U_i$ from the plurality of bits $A_i$, $A_{i+1}$, $A_{i+2}$, $B_i$, $B_{i+1}$, $B_{i+2}$ corresponding to operands A, B at corresponding bit locations i, i+1, i+2, wherein:

$U_i = $ (NOT $N_4$) AND (NOT $N_5$)

where $N_4 = (G_i$ OR $H_i)$ AND (NOT $P_{i+2}$), $N_5 = $ NOT $(G_i$ AND $H_i)$ AND $P_{i+2}$ AND (NOT $P_{i+1}$), $G_i = (A_i$ XOR $A_{i+1})$, $H_i = (B_i$ XOR $B_{i+1})$, and propagation carry pointers $P_i$, $P_{i+1}$, and $P_{i+2}$ are defined at bit locations i, i+1, i+2, respectively, as:

$P_i = A_i$ XOR $B_i$, $P_{i+1} = A_{i+1}$ XOR $B_{i+1}$, $P_{i+2} = A_{i+2}$ XOR $B_{i+2}$;

and a location value generator that generates the location value from the generated propagation value and that normalizes the unnormalized result.

3. An integrated circuit including an adder for combining input signals representing a first operand A and a second operand B to obtain a normalized sum output signal, each operand including a plurality of digits, the adder of the integrated circuit comprising:

a leading zero/one detector (LZD), responsive to the combining of the operands to an unnormalized result, that generates during the combining an exact location value of the most significant digit of the unnormalized result and which causes a shift signal to be generated corresponding to the exact location value for normalizing the unnormalized result, wherein the LZD includes:

a propagation value generator that generates a propagation value from the input signals; and a location value generator that generates the location value from the generated propagation value and that normalizes the unnormalized result, wherein the location value generator includes a circuit that generates the location value $L_i$ from the plurality of bits $A_i$, $A_{i+1}$, $A_{i+2}$, $B_i$, $B_{i+1}$, $B_{i+2}$ corresponding to operands A, B at corresponding bit locations i, i+1, i+2, wherein:

$L_i = $ (NOT $U_i$) AND $V_i$ AND $X_i$ where $$V_i = \begin{cases} logic 1 & \text{if } i = q \\ \text{AND}(U_{i+1}, U_q) & \text{if } i < q \end{cases}$$

$$W_i = \begin{cases} logic 1 & \text{if } i \geq N - D \\ \text{AND}(U_r, U_s) & \text{if } i < N - D \end{cases}$$

$X_i = $ (NOT AND $(U_p, U_q)$) AND $W_i$ where N is the number of bits in the operands A and B, D is a predetermined operating characteristic, [ ] is the least integer function, k=[i/D] for i=0 to N−1, p=D*k, q=D*(k+1)−1, r=D*(k+1) for i<N−1 and r=N−1 for i=N−1, s=N−1, and the function AND(x, y) is defined as the ANDing of a sequences of values ranging from x to y, and $U_i$, $U_p$, $U_q$, $U_r$, and $U_s$ are propagation values associated with bit indices i, p, q, r, and s, respectively.

4. The integrated circuit of claim 3 further including:

a shift generator that determines a shifting condition from the location value and from parameters generated during the combining, the shift generator responsive to the shifting condition and generates a shift signal for use in normalizing the unnormalized result to generate the normalized sum output signal.

5. The integrated circuit of claim 4 further including:

a floating point addition circuit that combines the operands to generate the unnormalized result and the parameters.

6. The integrated circuit of claim 4 further including:

a normalizer, responsive to the shift signal, that shifts the unnormalized result to generate the normalized sum output signal.

7. A leading zero/one detector (LZD) comprising:

a propagation value generator that generates propagation values $U_i$ from the plurality of bits $A_i$, $A_{i+1}$, $A_{i+2}$, $B_i$, $B_{i+1}$, $B_{i+2}$ corresponding to input signals representing operands A, B at corresponding bit locations i, i+1, i+2;

a location value generator that generates location values $L_i$ indicating a most significant digit of an unnormalized sum of the operands A, B from the generated propagation values $U_i$, wherein:

$L_1 = $ (NOT $U_i$) AND $V_i$ AND $X_i$ where $$V_i = \begin{cases} logic 1 & \text{if } i = q \\ \text{AND}(U_{i+1}, U_q) & \text{if } i < q \end{cases}$$

$$W_i = \begin{cases} logic 1 & \text{if } i \geq N - D \\ \text{AND}(U_r, U_s) & \text{if } i < N - D \end{cases}$$

$X_i = $ (NOT AND $(U_p, U_q)$) AND $W_i$ where N is the number of bits in the operands A and B, D is a predetermined operating characteristic, [ ] is the least integer function, k=[i/D] for i=0 to N−1, p=D*k, q=D*(k+1)−1, r=D*(k+1) for i<N−1 and r=N−1 for i=N−1, s=N−1, and the function AND(x, y) is defined as the ANDing of a sequences of values ranging from x to y, and $U_i$, $U_p$, $U_q$, $U_r$, and $U_s$ are propagation values associated with bit indices i, p, q, r, and s, respectively.

8. The leading zero/one detector of claim 7, wherein the propagation value generator determines $U_i$ using a plurality of logic gates according to:

$U_i$=(NOT $N_1$) AND (NOT $N_2$) AND (NOT $N_3$)

where $N_1$=$P_i$ AND (NOT $P_{i+1}$)

$N_2$=(NOT $P_i$) AND (NOT $P_{i+1}$) AND (NOT $P_{i+2}$) AND $G_i$, $N_3$=(NOT $P_i$) AND (NOT $P_{i+1}$) AND $P_{i+2}$ AND (NOT $G_i$), with $G_i$=($A_i$ XOR $A_{i+1}$), and propagation carry pointers $P_i$, $P_{i+1}$, and $P_{i+2}$ are defined at bit locations i, i+1, i+2, respectively, as:

$P_i$=$A_i$ XOR $B_i$, $P_{i+1}$=$A_{i+1}$ XOR $B_{i+1}$, $P_{i+2}$=$A_{i+2}$ XOR $B_{i+2}$.

9. The leading zero/one detector of claim 7, wherein the propagation value generator determines $U_i$ using a plurality of logic gates according to:

$U_i$=(NOT $N_4$) AND (NOT $N_5$)

where $N_4$=($G_i$ OR $H_i$) AND (NOT $P_{i+2}$), $N_5$=NOT ($G_i$ AND $H_i$) AND $P_{i+2}$ AND (NOT $P_{i+1}$), $G_i$=($A_i$ XOR $A_{i+1}$), $H_i$=($B_i$ XOR $B_{i+1}$), and propagation carry pointers $P_i$, $P_{i+1}$, and $P_{i+2}$ are defined at bit locations i, i+1, i+2, respectively, as:

$P_i$=$A_i$ XOR $B_i$, $P_{i+1}$=$A_{i+1}$ XOR $B_{i+1}$, $P_{i+2}$=$A_{i+2}$ XOR $B_{i+2}$.

10. The leading zero/one detector of claim 7, wherein the propagation value generator determines $U_i$ using a plurality of logic gates configured in at most 5 logic levels.

11. An adder comprising:
a floating point addition circuit that generates an unnormalized result and associated summation parameters from input signals corresponding to operands;
a leading zero/one detector (LZD), responsive to the combining of the operands to the unnormalized result, that generates during the combining an exact location value of the most significant digit of the unnormalized result, wherein the LZD includes:
a propagation value generator that generates propagation values $U_i$ from the plurality of bits $A_i$, $A_{i+1}$, $A_{i+2}$, $B_i$, $B_{i+1}$, $B_{i+2}$ corresponding to input signals representing operands A, B at corresponding bit locations i, i+1, i+2, wherein:

$U_i$=(NOT $N_1$) AND (NOT $N_2$) AND (NOT $N_3$)

where $N_1$=$P_i$ AND (NOT $P_{i+1}$), $N_2$=(NOT $P_i$) AND (NOT $P_{i+1}$) AND (NOT $P_{i+2}$) AND $G_i$, $N_3$=(NOT $P_i$) AND (NOT $P_{i+1}$) AND $P_{i+2}$ AND (NOT $G_i$), $G_i$=($A_i$ XOR $A_{i+1}$), and propagation carry pointers $P_i$, $P_{i+1}$, and $P_{i+2}$ are defined at bit locations i, i+1, i+2, respectively, as:

$P_i$=$A_i$ XOR $B_i$, $P_{i+1}$=$A_{i+1}$ XOR $B_{i+1}$, $P_{i+2}$=$A_{i+2}$ XOR $B_{i+2}$;

and a shift generator that determines a shifting condition from the exact location value and from the summation parameters generated during the combining, the shift generator responsive to the shifting condition for generating a shift signal corresponding to the exact location value; and a normalizer, responsive to the shifting signal corresponding to the exact location value, that normalizes the unnormalized result to generate a normalized sum output signal corresponding to the sum of the operands.

12. An adder comprising:
a floating point addition circuit that generates an unnormalized result and associated summation parameters from input signals corresponding to operands;
a leading zero/one detector (LZD), responsive to the combining of the operands to the unnormalized result, that generates during the combining an exact location value of the most significant digit of the unnormalized result, wherein the LZD includes:
a propagation value generator that generates propagation values $U_i$ from the plurality of bits $A_i$, $A_{i+1}$, $A_{i+2}$, $B_i$, $B_{i+1}$, $B_{i+2}$ corresponding to input signals representing operands A, B at corresponding bit locations i, i+1, i+2, wherein:

$U_i$=(NOT $N_4$) AND (NOT $N_5$)

where $N_4$=($G_i$ OR $H_i$) AND (NOT $P_{i+2}$), $N_5$=NOT ($G_i$ AND $H_i$) AND $P_{i+2}$ AND (NOT $P_{i+1}$), $G_i$=($A_i$ XOR $A_{i+1}$), $H_i$=($B_i$ XOR $B_{i+1}$), and propagation carry pointers $P_i$, $P_{i+1}$, and $P_{i+2}$ are defined at bit locations i, i+1, i+2, respectively, as:

$P_i$=$A_i$ XOR $B_i$, $P_{i+1}$=$A_{i+1}$ XOR $B_{i+1}$, $P_{i+2}$=$A_{i+2}$ XOR $B_{i+2}$;

a shift generator that determines a shifting condition from the exact location value and from the summation parameters generated during the combining, the shift generator responsive to the shifting condition for generating a shift signal corresponding to the exact location value; and a normalizer, responsive to the shifting signal corresponding to the exact location value, that normalizes the unnormalized result to generate a normalized sum output signal corresponding to the sum of the operands.

13. An adder comprising:

a floating point addition circuit that generates an unnormalized result and associated summation parameters from input signals corresponding to operands;

a leading zero/one detector (LZD), responsive to the combining of the operands to the unnormalized result, that generates during the combining an exact location value of the most significant digit of the unnormalized result, wherein the LZD includes:

a location value generator that generates location values $L_i$ indicating a most significant digit of an unnormalized sum of the operands A, B from the generated propagation values $U_i$, wherein:

$$L_i = (\text{NOT } U_i) \text{ AND } V_i \text{ AND } X_i$$

where $$V_i = \begin{cases} \text{logic1} & \text{if } i = q \\ \text{AND}(U_{i+1}, U_q) & \text{if } i < q \end{cases}$$

$$W_i = \begin{cases} \text{logic1} & \text{if } i \geq N - D \\ \text{AND}(U_r, U_s) & \text{if } i < N - D \end{cases}$$

$$X_i = (\text{NOT AND }(U_p, U_q)) \text{ AND } W_i$$

where N is the number of bits in the operands A and B, D is a predetermined operating characteristic, [ ] is the least integer function, k=[i/D] for i=0 to N−1, p=D*k, q=D*(k+1)−1, r=D*(k+1) for i<N−1 and r=N−1 for i=N−1, s=N−1, and the function AND(x, y) is defined as the ANDing of a sequences of values ranging from x to y, and $U_i$, $U_p$, $U_q$, $U_r$, and $U_s$ are propagation values associated with bit indices i, p, q, r, and s, respectively;

a shift generator that determines a shifting condition from the exact location value and from the summation parameters generated during the combining, the shift generator responsive to the shifting condition for generating a shift signal corresponding to the exact location value; and a normalizer, responsive to the shifting signal corresponding to the exact location value, that normalizes the unnormalized result to generate a normalized sum output signal corresponding to the sum of the operands.

14. The adder of claim 13 wherein the shift generator determines if a sum bit of the unnormalized result at a bit location is different from the value of the unnormalized result as the shifting condition to generate a shift value as the shifting signal, and to generate a no-shift value otherwise as the shifting signal.

15. A method for adding operands A, B to obtain a normalized sum therefrom comprising the steps of:

receiving input signals corresponding to the operands A, B;

combining the operands to generate an unnormalized result and associated summation parameters from input signals;

determining, during the combining, an exact location value of the most significant digit of the unnormalized result, wherein the step of determining the location value includes the step of:

generating propagation values $U_i$ from the plurality of bits $A_1$, $A_{i+1}$, $A_{i+2}$, $B_i$, $B_{i+1}$, $B_{1+2}$ corresponding to input signals representing operands A, B at corresponding bit locations i, i+1, i+2, wherein:

$$U_i = (\text{NOT } N_1) \text{ AND } (\text{NOT } N_2) \text{ AND } (\text{NOT } N_3)$$

where $$N_1 = P_i \text{ AND } (\text{NOT } P_{i+1}),$$

$$N_2 = (\text{NOT } P_i) \text{ AND } (\text{NOT } P_{i+1}) \text{ AND } (\text{NOT } P_{i+2}) \text{ AND } G_i,$$

$$N_3 = (\text{NOT } P_i) \text{ AND } (\text{NOT } P_{i+1}) \text{ AND } P_{i+2} \text{ AND } (\text{NOT } G_i),$$

$$G_i = (A_i \text{ XOR } A_{i+1}),$$

and propagation carry pointers $P_i$, $P_{i+1}$, and $P_{i+2}$ are defined at bit locations i, i+1, i+2, respectively, as:

$$P_i = A_i \text{ XOR } B_i,$$

$$P_{i+1} = A_{i+1} \text{ XOR } B_{i+1},$$

$$P_{i+2} = A_{i+2} \text{ XOR } B_{i+2};$$

and determining a shifting condition from the exact location value and from the summation parameters generated during the combining;

generating a shift signal corresponding to the exact location value in response to the shifting condition; and normalizing the unnormalized result using the shifting signal corresponding to the exact location value to generate the normalized sum output signal corresponding to the normalized sum of the operands.

16. A method for adding operands A, B to obtain a normalized sum therefrom comprising the steps of:

receiving input signals corresponding to the operands A, B;

combining the operands to generate an unnormalized result and associated summation parameters from input signals;

determining, during the combining, an exact location value of the most significant digit of the unnormalized result, wherein the step of determining the location value includes the step of:

generating propagation values $U_i$ from the plurality of bits $A_i$, $A_{i+1}$, $A_{i+2}$, $B_i$, $B_{i+1}$, $B_{i+2}$ corresponding to input signals representing operands A, B at corresponding bit locations i, i+1, i+2, wherein:

$$U_i = (\text{NOT } N_4) \text{ AND } (\text{NOT } N_5)$$

where $$N_4 = (G_i \text{ OR } H_i) \text{ AND } (\text{NOT } P_{i+2}),$$

$$N_5 = \text{NOT } (G_i \text{ AND } H_i) \text{ AND } P_{i+2} \text{ AND } (\text{NOT } P_{i+1}),$$

$$G_i = (A_i \text{ XOR } A_{i+1}),$$

$$H_i = (B_i \text{ XOR } B_{i+1}),$$

and propagation carry pointers $P_i$, $P_{i+1}$, and $P_{i+2}$ are defined at bit locations i, i+1, i+2, respectively, as:

$$P_i = A_i \text{ XOR } B_i,$$

$$P_{i+1} = A_{i+1} \text{ XOR } B_{i+1},$$

$P_{i+2} = A_{i+2}$ XOR $B_{i+2}$;

determining a shifting condition from the exact location value and from the summation parameters generated during the combining;

generating a shift signal corresponding to the exact location value in response to the shifting condition; and normalizing the unnormalized result using the shifting signal corresponding to the exact location value to generate the normalized sum output signal corresponding to the normalized sum of the operands.

17. A method for adding operands A, B to obtain a normalized sum therefrom comprising the steps of:

receiving input signals corresponding to the operands A, B;

combining the operands to generate an unnormalized result and associated summation parameters from input signals;

generating, during the combining, an exact location value of the most significant digit of the unnormalized result;

determining a shifting condition from the exact location value and from the summation parameters generated during the combining, wherein the step of determining the location value includes the step of:

generating the location value $L_i$ indicating the most significant digit of the unnormalized sum of the operands A, B from the generated propagation values $U_i$, wherein:

$$L_i = (\text{NOT } U_i) \text{ AND } V_i \text{ AND } X_i$$

where $$V_i = \begin{cases} logic1 & \text{if } i = q \\ \text{AND}(U_{i+1}, U_q) & \text{if } i < q \end{cases}$$

$$W_i = \begin{cases} logic1 & \text{if } i \geq N - D \\ \text{AND}(U_r, U_s) & \text{if } i < N - D \end{cases}$$

$$X_i = (\text{NOT AND}(U_p, U_q)) \text{ AND } W_i$$

where N is the number of bits in the operands A and B, D is a predetermined operating characteristic, [ ] is the least integer function, k=[i/D] for i=0 to N−1, P=D*k, q=D*(k+1)−1, r=D*(k+1) for i<N−1 and r=N−1 for i=N−1, s=N−1, and the function AND(x, y) is defined as the ANDing of a sequences of values ranging from x to y, and $U_i$, $U_p$, $U_q$, $U_r$, and $U_s$ are propagation values associated with bit indices i, p, q, r, and s, respectively;

generating a shift signal corresponding to the exact location value in response to the shifting condition; and normalizing the unnormalized result using the shifting signal corresponding to the exact location value to generate the normalized sum output signal corresponding to the normalized sum of the operands.

18. The method of claim 17 wherein the step of determining a shifting condition includes the steps of:

determining if a sum bit of the unnormalized result at a bit location is different from the value of the unnormalized result as the shifting condition;

generating a shift value in response to the shifting condition as the shifting signal; and generating a no-shift value otherwise as the shifting signal.

* * * * *